(12) United States Patent
Anwar et al.

(10) Patent No.: US 11,554,510 B2
(45) Date of Patent: *Jan. 17, 2023

(54) TRIMMER DEVICE WITH AN ADJUSTABLE CUTTING ASSEMBLY

(71) Applicant: Walker & Co. Brands, Inc., Palo Alto, CA (US)

(72) Inventors: Mir M. Anwar, Jersey City, NJ (US); David-Henry Oliver, Palo Alto, CA (US); Jessica M. Gilbertson, San Francisco, CA (US); Adam A. Reed-Erickson, San Francisco, CA (US); Tristan J. Walker, Palo Alto, CA (US)

(73) Assignee: The Gillette Company LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,064

(22) Filed: Sep. 2, 2021

(65) Prior Publication Data

US 2021/0394377 A1 Dec. 23, 2021

Related U.S. Application Data

(63) Continuation of application No. 16/068,805, filed as application No. PCT/US2017/012783 on Jan. 10, 2017, now Pat. No. 11,161,262.

(Continued)

(51) Int. Cl.
*B26B 19/38* (2006.01)
*B26B 19/06* (2006.01)
*B26B 19/20* (2006.01)

(52) U.S. Cl.
CPC .......... *B26B 19/3873* (2013.01); *B26B 19/06* (2013.01); *B26B 19/205* (2013.01); *B26B 19/3853* (2013.01)

(58) Field of Classification Search
CPC ..... B26B 19/02; B26B 16/046; B26B 19/205; B26B 23/0042; B26B 19/06;
(Continued)

(56) References Cited

U.S. PATENT DOCUMENTS 1,774,046 A * 8/1930 Wahl ................. B26B 19/205
30/201
1,877,749 A * 9/1932 Andis ................ B26B 19/205
30/201

(Continued)

*Primary Examiner* — Ghassem Alie
(74) *Attorney, Agent, or Firm* — John M. Lipchitz

(57) ABSTRACT

An electric-powered trimmer with a handle. A battery pack positioned in the handle. An electrical circuit positioned in the handle and electrically connected with the battery pack. The electrical circuit including a motor having a drive shaft, and a cutting assembly removeably coupled to the handle. The handle extends along a longitudinal axis and has an inner wall that defines a receptacle in a longitudinal end. The battery pack is configured to rotate about the longitudinal axis relative to the handle between (i) a first position in which the battery pack is secured within the receptacle of the handle and (ii) a second position in which the battery pack is configured to be removed from the receptacle of the handle. A plurality of light emitting diodes (LEDs) positioned in the inner wall of the handle. The inner wall includes a transparent section that covers the plurality of LEDs.

17 Claims, 13 Drawing Sheets

Related U.S. Application Data

(60) Provisional application No. 62/276,926, filed on Jan. 10, 2016.

(58) Field of Classification Search
CPC ... B26B 19/063; B26B 19/3846; B26B 19/20; B26B 19/38; B26B 19/048; A10K 14/00
USPC .... 30/34.05, 43.1, 200, 201, 202, 210, 34.1, 30/233, 196, 233.5, 43, 43.2, 208, 30/43.7–43.92, 228, 199, 223, 224
See application file for complete search history.

(56) References Cited

U.S. PATENT DOCUMENTS

| | | | |
|---|---|---|---|
| 5,367,772 | A | 11/1994 | Ogawa |
| 7,234,242 | B2 * | 6/2007 | Yao .................... B26B 19/3846 30/233 |
| 8,341,846 | B1 | 1/2013 | Holmes |
| 2003/0051347 | A1 | 3/2003 | Melton et al. |
| 2004/0013938 | A1 | 1/2004 | Murashige et al. |
| 2006/0246347 | A1 | 11/2006 | Diehl et al. |
| 2007/0213742 | A1 | 9/2007 | Callahan |
| 2008/0155834 | A1 | 7/2008 | Li et al. |
| 2008/0282550 | A1 | 11/2008 | Piwaron |
| 2010/0031781 | A1 * | 2/2010 | Ito ......................... B25H 3/006 173/217 |
| 2010/0214768 | A1 | 8/2010 | Dixon et al. |
| 2013/0312264 | A1 * | 11/2013 | Cohen .................. B26B 21/526 30/34.05 |

\* cited by examiner

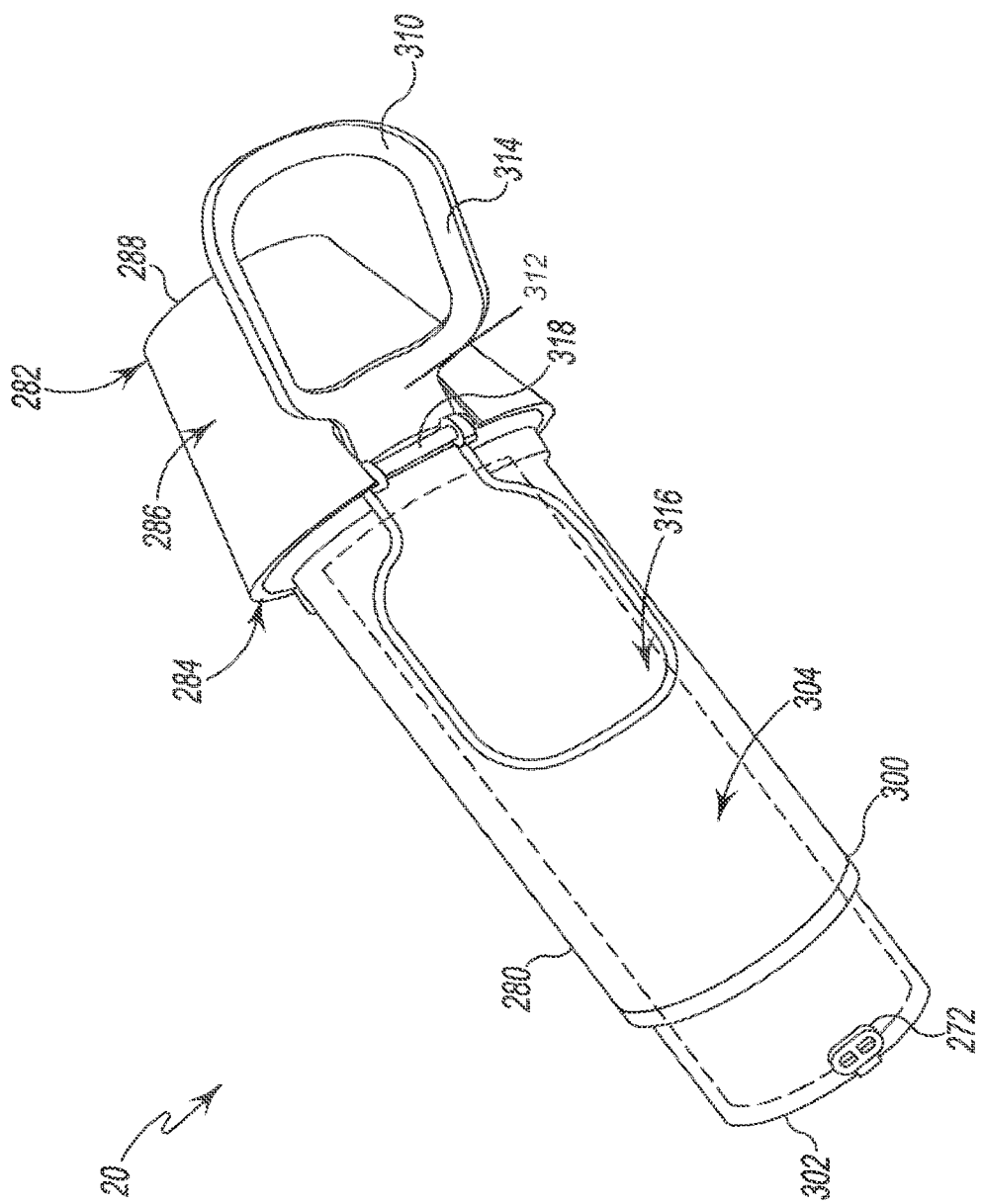

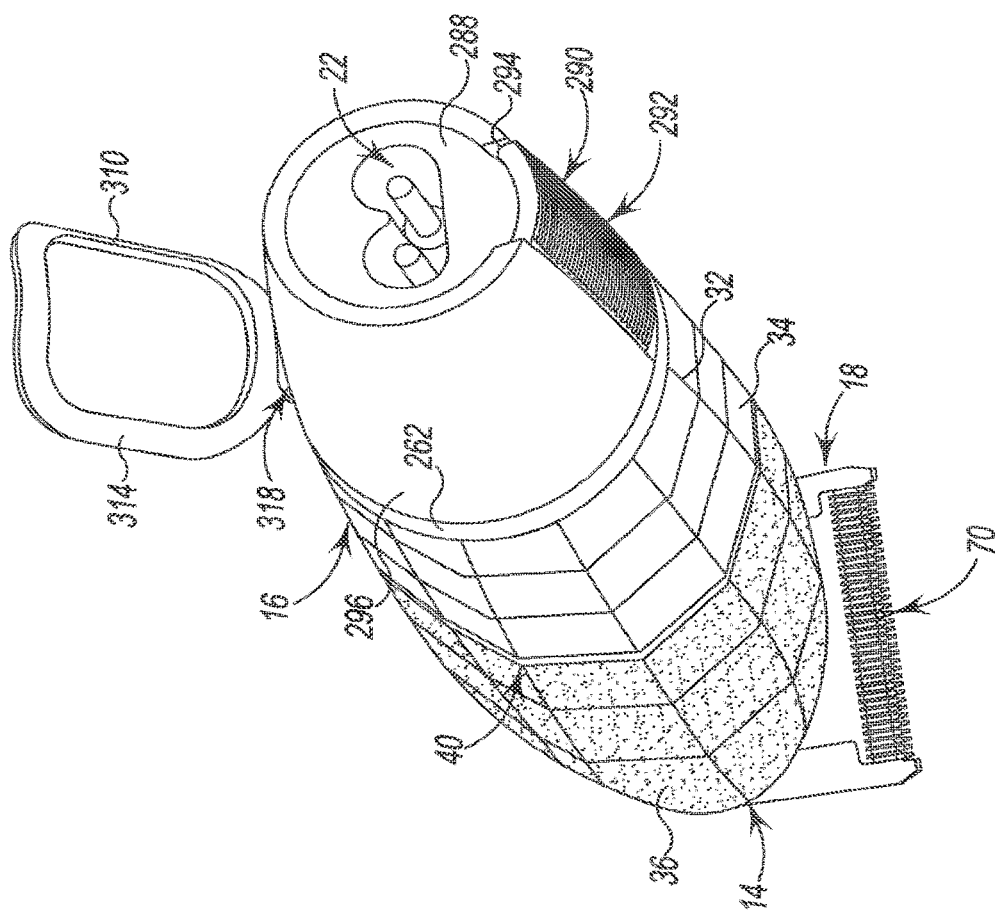

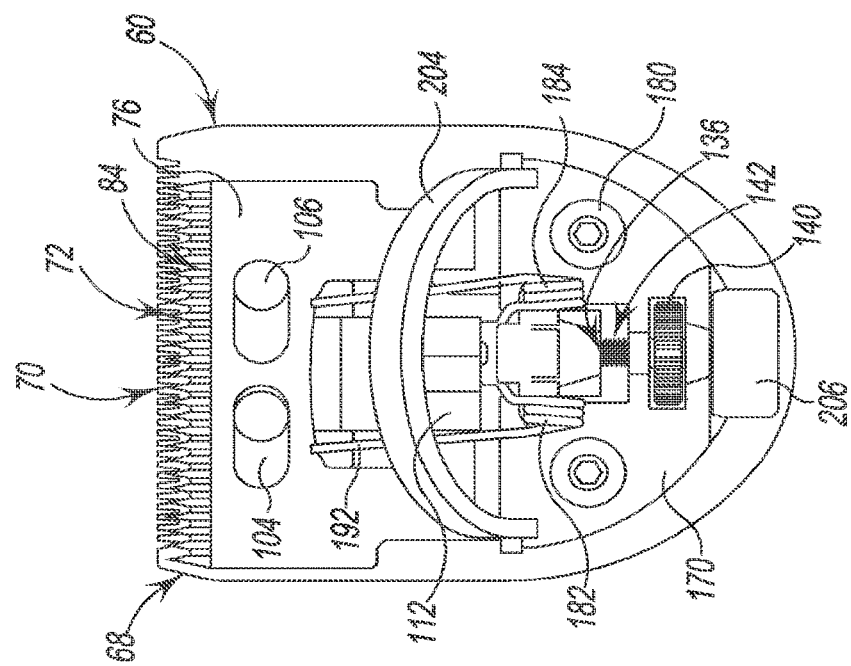
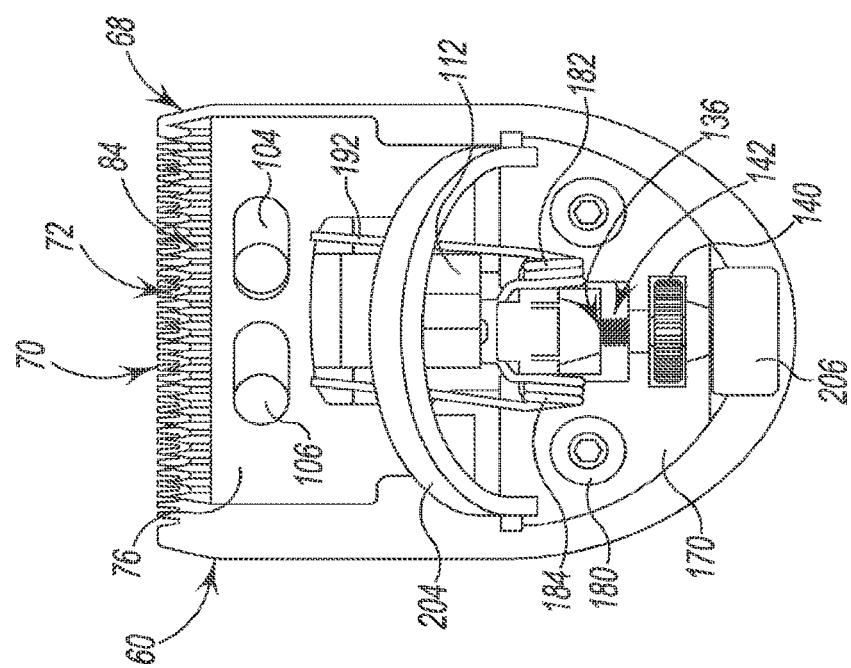

TRIMMER DEVICE WITH AN ADJUSTABLE CUTTING ASSEMBLY

CROSS REFERENCE TO RELATED APPLICATIONS

This application is a continuation of U.S. patent application Ser. No. 16/068,805, filed Jul. 9, 2018, now U.S. Pat. No. 11,161,262, which is a national stage entry under 37 C.F.R. § 371(c) of PCT International Application No. PCT/US2017/012783, filed Jan. 10, 2017, which claims priority under 35 U.S.C § 119(e) to U.S. Provisional Application Ser. No. 62/276,926, filed Jan. 10, 2016, which are expressly incorporated herein by reference. Cross-reference is made to U.S. Design patent application Ser. No. 29/551,055 entitled "Trimmer," filed Jan. 10, 2016 and is expressly incorporated herein by reference.

TECHNICAL FIELD

The present disclosure relates to electric cutting devices used for trimming and grooming hair.

BACKGROUND

In general, barbers and hairstylists use electric trimmers when trimming hair. Electric trimmers may also be used by individuals for personal care and grooming purposes. Electric trimmers may be used to cut hair for a variety of purposes, including, but not limited to, shaving, shaping beards and mustaches, and trimming hair generally.

SUMMARY

According to one aspect of the disclosure, an electric-powered trimmer is disclosed. The trimmer includes a handle, a battery pack positioned in the handle, and an electrical circuit positioned in the handle. The battery pack includes a battery for providing electrical power, and the electrical circuit is electrically connected with the battery. The electrical circuit includes a motor having a drive shaft.

The trimmer also includes a cutting assembly removeably coupled to the handle. The cutting assembly comprises a stationary blade and a moveable blade positioned on the stationary blade such that a cutting gap is defined between the moveable blade and the stationary blade. The moveable blade is configured to move along a first axis and a second axis extending orthogonal to the first axis.

The trimmer further includes a drive mechanism connected between the drive shaft and the moveable blade to move the moveable blade relative to the stationary blade along the first axis and an adjustment mechanism coupled to the moveable blade. The adjustment mechanism includes an adjustment screw operable to move the moveable blade along the second axis relative to the stationary blade to selectively change the size of the cutting gap.

In some embodiments, the handle may extend along a longitudinal axis. The handle may have an inner wall that defines a receptacle in a longitudinal end, and the battery pack may be received in the receptacle of the handle. In some embodiments, the battery pack may be configured to rotate about the longitudinal axis relative to the handle between a first position in which the battery pack is secured within the receptacle of the handle and a second position in which the battery pack is configured to be removed from the receptacle of the handle.

In some embodiments, the battery may be in the second position. In the second position, the battery pack may be configured to slide along the longitudinal axis of the handle to be removed from the receptacle.

In some embodiments, the battery pack may include a pair of locking bayonets that extend outwardly from a case housing the battery. The handle may include a pair of slots defined in the inner wall, and each slot may be sized to receive a locking bayonet. The battery pack may be rotated from the second position to the first position. In the first position, each bayonet may be received in one of the pair of slots to secure the battery pack to the handle.

In some embodiments, the battery pack may include locking bayonets that extend outwardly from a first end of the case, and may include a power socket defined on a second end of the case.

In some embodiments, the battery pack may include a switch operable to energize the motor. In some embodiments, the switch may be moveable along the longitudinal axis between a first position in which the motor may be energized and a second position in which is the motor may be deenergized.

In some embodiments a plurality of light emitting diodes (LEDs) may be positioned in the inner wall of the handle, and the inner wall may include a transparent section that covers the plurality of LEDs. In some embodiments, the transparent section may extend from a first end positioned in the receptacle to a second end positioned at the longitudinal end of the handle. Light emitted from the LEDs may be transmitted outward from the longitudinal end of the handle.

In some embodiments, a visual indicator may be secured to the handle. In some embodiments, the visual indicator may include a plurality of light emitting diodes (LEDs).

In some embodiments, the battery pack may include a mounting hook that may be pivotable between a retracted position and an extended position. In the retracted position, the mounting hook may be received in the receptacle. In the extended position, the mounting hook may extend outwardly from the receptacle. In some embodiments, the battery pack may have a groove sized to receive the mounting hook when the mounting hook is the retracted position.

In some embodiments, a grove may be defined in the handle to receive a mounting bar connected to the stationary blade of the cutting assembly. The mounting bar may extend outwardly from the stationary blade and may be received in the groove to secure the cutting assembly to the handle. In some embodiments, a slot may be defined in the handle to receive a flange that extends outwardly from the stationary blade.

In some embodiments, the adjustment mechanism may include a manually-operated wheel secured to the adjustment screw. In one embodiment, the manually-operated wheel may be thumb-operated wheel or other wheel that may be operated without a tool. The wheel may be rotated in a first direction in which the cutting gap is decreased. The wheel may also be rotated in a second direction, opposite the first direction, in which the cutting gap is increased. In some embodiments, the wheel may be received in a receptacle defined in the handle when the cutting assembly is coupled to the handle. In some embodiments, the adjustment screw may extend along the second axis.

In some embodiments, the adjustment mechanism may further include a guide plate with a peg that extends upwardly from a first end of the guide plate. A block may extend upwardly from a second end of the guide plate. The adjustment screw may include a threaded shaft that may be positioned in the block. The moveable blade may include an oblong slot that extends parallel to the first axis, and that may receive the peg. In some embodiments, the moveable blade may be configured to move along the first axis relative to the peg.

In some embodiments, the drive shaft may include a ball to secure the drive shaft to the drive mechanism. In some embodiments, the motor may be configured to rotate the drive shaft about a rotational axis.

According to another aspect of the disclosed embodiments, an electric-powered trimmer is disclosed. The trimmer includes a handle, a cutting assembly configured to be driven by a motor along a first axis, and a battery pack positioned in a receptacle defined in the handle, and an electrical circuit positioned in the handle.

The battery pack includes a battery for providing electrical power, and the electrical circuit is electrically connected with the battery. The electrical circuit includes a motor having a drive shaft. The battery pack further includes a body having a cylindrical outer surface, a power switch positioned on the body, and a socket configured to receive a plug of an electrical cable. The power switch moves along a second axis that extends transverse to the first axis between a first position and a second position. In the first position, the motor is energized to drive the cutting assembly, and in the second position the motor is deenergized.

In some embodiments, the battery pack may include a mounting hook that may be pivotable between a retracted position and an extended position. In the retracted position, the mounting hook may be received in the receptacle. In the extended position, the mounting hook may extend outwardly from the receptacle. In some embodiments, the cylindrical outer surface of the battery pack may have a defined groove. The groove may be sized to receive the mounting hook when the mounting hook is the retracted position.

In some embodiments, the battery pack may include a pair of locking bayonets. The pair of locking bayonets may extend outwardly from the cylindrical outer surface of the battery pack. The inner wall of the handle may include a defined pair of slots sized to receive the pair of locking bayonets. Additionally, the battery pack may be configured to rotate to a locked position. In the locked position, each bayonet may be received in one of the pair of slots to secure the battery pack to the handle.

In some embodiments, a plurality of light emitting diodes (LEDs) may be positioned in the inner wall of the handle, and the inner wall of the handle may include a transparent section that covers the plurality of LEDs. In some embodiments, the transparent section may extend from a first end positioned in the receptacle to a second end positioned at a longitudinal end of the handle, so that light emitted from the LEDs may be transmitted outward from the longitudinal end.

In some embodiments, the electric-powered trimmer may further include an adjustment mechanism. The adjustment mechanism may include an adjustment screw and thumb-operated wheel. The adjustment mechanism may be operable to selectively change a cutting gap of the cutting assembly.

According to another aspect of the disclosure, an electric-powered trimmer is disclosed. The trimmer includes a handle and an electrical circuit positioned in the handle. The electrical circuit includes a motor having a drive shaft. The trimmer also includes a cutting assembly removeably coupled to the handle. The cutting assembly comprises a stationary blade and a moveable blade positioned on the stationary blade such that a cutting gap is defined between the moveable blade and the stationary blade. The moveable blade is configured to move along a first axis and a second axis extending orthogonal to the first axis.

The trimmer further includes a drive mechanism connected between the drive shaft and the moveable blade to move the moveable blade relative to the stationary blade along the first axis and an adjustment mechanism coupled to the moveable blade. The adjustment mechanism includes an adjustment screw operable to move the moveable blade along the second axis relative to the stationary blade to selectively change the size of the cutting gap.

In some embodiments, a groove may be defined in the handle to secure the cutting assembly to the handle. The cutting assembly may include a mounting bar connected to the stationary blade that extends outwardly from the stationary blade. The mounting bar may be received in the groove to secure the cutting assembly to the handle. In some embodiments, a slot may be defined in the handle to receive a flange that extends outwardly from the stationary blade.

In some embodiments, the adjustment mechanism may include a manually-operated wheel secured to the adjustment screw. In one embodiment, the manually-operated wheel may be thumb-operated wheel or other wheel that may be operated without a tool. The wheel may be rotated in a first direction and a second direction opposite the first direction. When the wheel is rotated in the first direction, the cutting gap may be decreased. When the wheel is rotated in the second direction opposite the first direction, the cutting gap may be increased. In some embodiments, the wheel may be received in a receptacle defined in the handle when the cutting assembly is coupled to the handle. In some embodiments, the adjustment screw may extend along the second axis.

In some embodiments, the adjustment mechanism may further include a guide plate having a peg that extends upwardly from a first end of the guide. A block may extend upwardly from a second end of the guide plate. The adjustment screw may include a threaded shaft positioned in the block. The moveable blade may include an oblong slot that extends parallel to the first axis, and that may receive the peg. In some embodiments, the moveable blade may be configured to move along the first axis relative to the peg.

In some embodiments, the drive shaft may include a ball to secure the drive shaft to the drive mechanism. In some embodiments, the motor may be configured to rotate the drive shaft about a rotational axis.

According to a further aspect of the disclosed embodiments, an electric-powered trimmer includes a handle and a battery pack positioned in the handle. The battery pack includes a battery for providing electrical power. An electrical circuit is positioned in the handle and is electrically connected with the battery. The electrical circuit includes a motor having a drive shaft. A cutting assembly is removeably coupled to the handle. The cutting assembly includes a stationary blade. A moveable blade is positioned on the stationary blade such that a cutting gap is defined between the moveable blade and the stationary blade. The moveable blade is configured to move along a first axis and a second axis extending orthogonal to the first axis. A drive mechanism is connected between the drive shaft and the moveable blade to move the moveable blade relative to the stationary blade along the first axis. An adjustment mechanism is coupled to the moveable blade. The adjustment mechanism includes an adjustment screw operable to move the moveable blade along the second axis relative to the stationary blade to selectively change the size of the cutting gap. The handle extends along a longitudinal axis and has an inner wall that defines a receptacle in a longitudinal end. The battery pack is received in the receptacle of the handle. The battery pack is configured to rotate about the longitudinal axis relative to the handle between a first position in which the battery pack is secured within the receptacle of the handle and a second position in which the battery pack is configured to be removed from the receptacle of the handle. A plurality of light emitting diodes (LEDs) is positioned in the inner wall of the handle. The inner wall includes a transparent section that covers the plurality of LEDs.

In some embodiments, the battery pack may include a mounting hook pivotable between a retracted position in which the mounting hook is received in the receptacle and an extended position in which the mounting hook extends outwardly from the receptacle. The battery pack may have a groove sized to receive the mounting hook when the mounting hook is the retracted position. When the battery is in the second position, the battery pack may be configured to slide along the longitudinal axis of the handle to be removed from the receptacle. The battery pack may include a pair of locking bayonets extending outwardly from a case housing the battery. The handle may include a pair of slots defined in the inner wall. Each slot may be sized to receive a locking bayonet. The battery pack may be rotated to the first position. Each bayonet may be received in one of the pair of slots to secure the battery pack to the handle. The locking bayonets may extend outwardly from a first end of the case. The battery pack may include a power socket defined on a second end of the case. The transparent section may extend from a first end positioned in the receptacle to a second end positioned at the longitudinal end of the handle such that light emitted from the LEDs is transmitted outward from the longitudinal end. The handle may have a groove defined therein. The cutting assembly may include a mounting bar connected to the stationary blade. The mounting bar may extend outwardly from the stationary blade and received in the groove to secure the cutting assembly to the handle. The handle may have a slot defined therein. The cutting assembly may include a flange extending outwardly from the stationary blade and received in the handle slot.

According to another aspect of the disclosed embodiments, an electric-powered trimmer includes a handle and a battery pack positioned in the handle. The battery pack includes a battery for providing electrical power. An electrical circuit is positioned in the handle and is electrically connected with the battery. The electrical circuit includes a motor having a drive shaft. A cutting assembly is removeably coupled to the handle. The cutting assembly includes a stationary blade. A moveable blade is positioned on the stationary blade such that a cutting gap is defined between the moveable blade and the stationary blade. The moveable blade is configured to move along a first axis and a second axis extending orthogonal to the first axis. A drive mechanism is connected between the drive shaft and the moveable blade to move the moveable blade relative to the stationary blade along the first axis. An adjustment mechanism is coupled to the moveable blade. The adjustment mechanism includes an adjustment screw operable to move the moveable blade along the second axis relative to the stationary blade to selectively change the size of the cutting gap. The handle extends along a longitudinal axis and has an inner wall that defines a receptacle in a longitudinal end. The battery pack is received in the receptacle of the handle. The battery pack is configured to rotate about the longitudinal axis relative to the handle between a first position in which the battery pack is secured within the receptacle of the handle and a second position in which the battery pack is configured to be removed from the receptacle of the handle. The handle has a groove defined therein. The cutting assembly include a mounting bar connected to the stationary blade. The mounting bar extends outwardly from the stationary blade and received in the groove to secure the cutting assembly to the handle.

In some embodiments, the handle may have a slot defined therein. The cutting assembly may include a flange extending outwardly from the stationary blade and received in the handle slot. The battery pack may include a mounting hook pivotable between a retracted position in which the mounting hook is received in the receptacle and an extended position in which the mounting hook extends outwardly from the receptacle. The battery pack may have a groove sized to receive the mounting hook when the mounting hook is the retracted position. When the battery is in the second position, the battery pack may be configured to slide along the longitudinal axis of the handle to be removed from the receptacle. The battery pack ma include a pair of locking bayonets extending outwardly from a case housing the battery. The handle may include a pair of slots defined in the inner wall. Each slot may be sized to receive a locking bayonet. The battery pack may be rotated to the first position. Each bayonet may be received in one of the pair of slots to secure the battery pack to the handle. The locking bayonets may extend outwardly from a first end of the case. The battery pack may include a power socket defined on a second end of the case.

According to yet another aspect of the disclosed embodiments, an electric-powered trimmer includes a handle and a battery pack positioned in the handle. The battery pack includes a battery for providing electrical power. An electrical circuit is positioned in the handle and electrically connected with the battery. The electrical circuit includes a motor having a drive shaft. A cutting assembly is removeably coupled to the handle. The cutting assembly includes a stationary blade. A moveable blade is positioned on the stationary blade such that a cutting gap is defined between the moveable blade and the stationary blade. The moveable blade is configured to move along a first axis and a second axis extending orthogonal to the first axis. A drive mechanism is connected between the drive shaft and the moveable blade to move the moveable blade relative to the stationary blade along the first axis. An adjustment mechanism is coupled to the moveable blade. The adjustment mechanism includes an adjustment screw operable to move the moveable blade along the second axis relative to the stationary blade to selectively change the size of the cutting gap. The handle extends along a longitudinal axis and has an inner wall that defines a receptacle in a longitudinal end. The battery pack is received in the receptacle of the handle. The battery pack is configured to rotate about the longitudinal axis relative to the handle between a first position in which the battery pack is secured within the receptacle of the handle and a second position in which the battery pack is configured to be removed from the receptacle of the handle. The battery pack includes a mounting hook that is configured to be received in the receptacle.

In some embodiments, a plurality of light emitting diodes (LEDs) may be positioned in the inner wall of the handle. The inner wall may include a transparent section that covers the plurality of LEDs. The handle may have a groove defined therein. The cutting assembly may include a mounting bar connected to the stationary blade. The mounting bar may extend outwardly from the stationary blade and received in the groove to secure the cutting assembly to the handle. The mounting hook may pivotable between a retracted position in which the mounting hook is received in the receptacle and an extended position in which the mounting hook extends outwardly from the receptacle.

BRIEF DESCRIPTION OF THE DRAWINGS

The detailed description particularly refers to the following figures, in which:

FIG. 12 is a view similar to FIG. 11 illustrating the mounting hook of the battery pack in an extended position;

FIG. 13 is a rear perspective view of the battery pack secured to the handle of the trimmer of FIG. 1 illustrating the mounting hook an extended position; and FIGS. 14-15 are top plan views illustrating the relative movement of the cutting blades during operation.

DETAILED DESCRIPTION OF THE DRAWINGS

Figure 1:
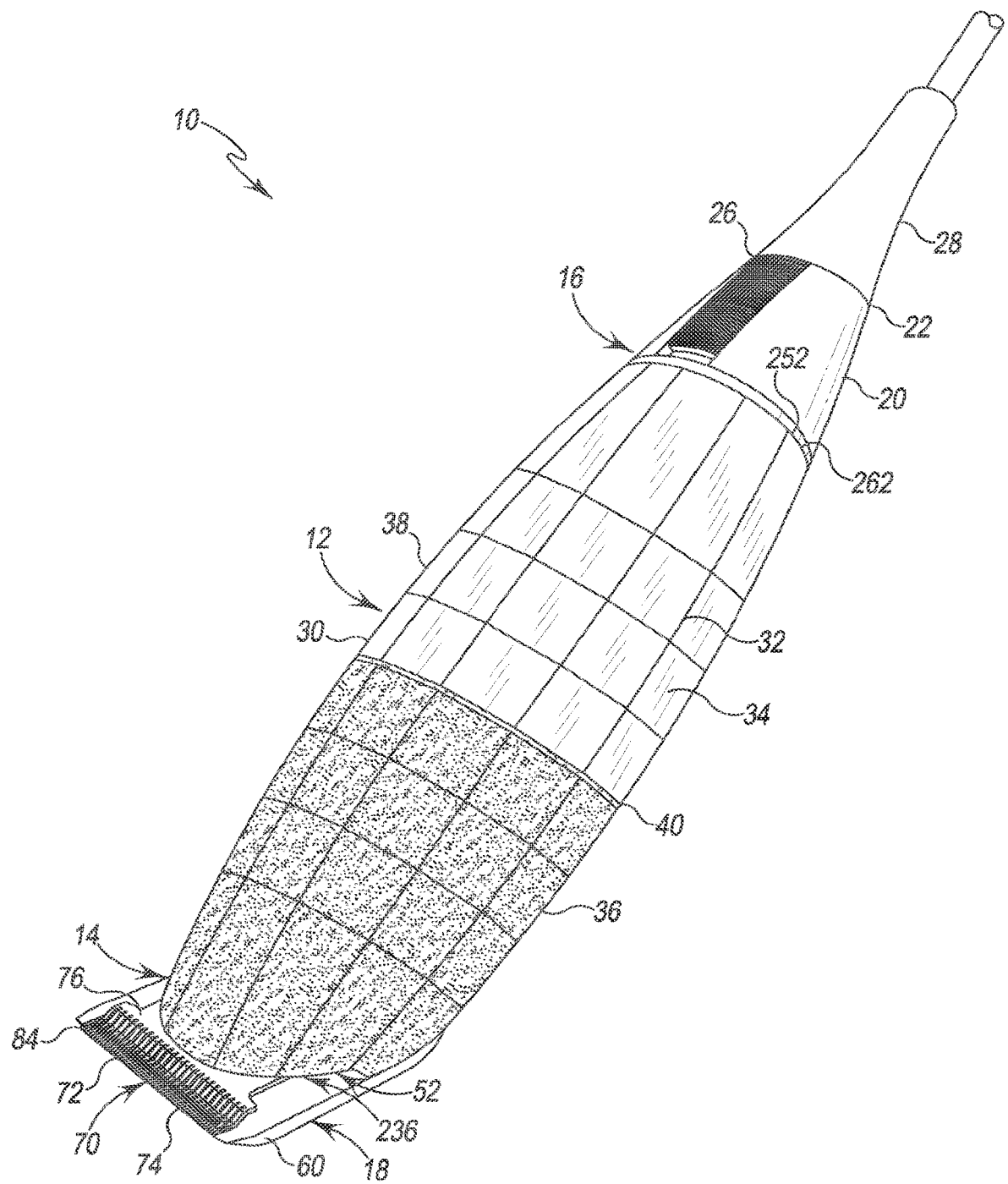
FIG. 1 is a perspective view of an electric hair trimmer.

While the concepts of the present disclosure are susceptible to various modifications and alternative forms, specific exemplary embodiments thereof have been illustrated by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the embodiments as defined by the appended claims.

Referring now to FIG. 1, an electric-powered trimming device 10 for use in trimming beards is shown. The trimmer 10 includes an elongated handle 12 extending from a distal end 14 to a proximal end 16, a detachable cutting assembly 18 coupled to the distal end 14, and a battery pack 20 attached to a proximal end 16, which may be decoupled for charging or replacement. The battery pack 20 includes a power socket 22, which is sized to receive a plug 26 defined at one end of an electrical cord 28. The electrical cord 28 has a plug (not shown) defined at its opposite end that is configured to be received in a standard wall outlet. In that way, the trimmer 10 may be powered directly from a wall outlet when the electrical charge of the battery pack 20 is low or at the user's discretion.

Figure 2:
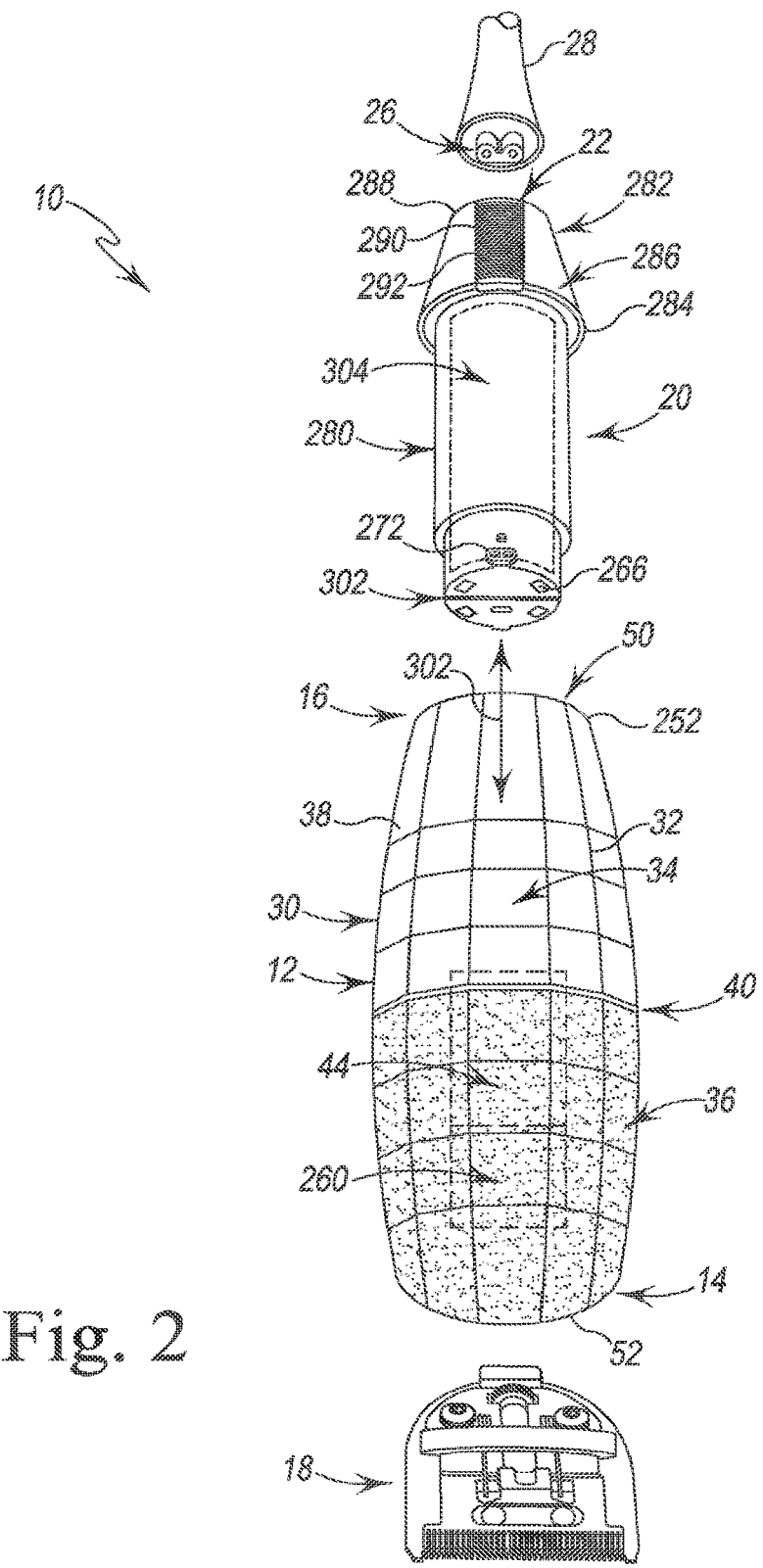
FIG. 2 is an exploded perspective view illustrating a cutting assembly, a handle, a battery pack of the trimmer of FIG. 1.

As shown in FIG. 2, the handle 12 includes an outer surface 30 that extends proximally from the distal end 14 to the proximal end 16. In the illustrative embodiment, the entire outer surface 30 is defined by a plurality of facets 32. Each facet 32 includes a planar surface 34 that is angled relative to the other facets 32. It should be appreciated that in other embodiments the each facet may include a curved surface. In still other embodiments, the part or all of the outer surface of the handle may be formed as a single continuous surface without any facets.

In the illustrative embodiment, the outer surface 30 includes a distal section 36 that extends from the distal end 14 to a circumferential groove 40 and a proximal section 38 that extends from the proximal end 16 to the groove 40. The surface of each facet 32 of the distal section 36 is textured to define an area of the handle 12 that may be gripped by the user, while the surface of each facet 32 of the proximal section 38 is substantially smooth. The distal section 36 is formed from a plastic material to provide the texture, and the proximal section 38 is formed from a metallic material. In one embodiment, the proximal section 38 may be formed from aluminum. In another embodiment, the proximal section may be formed from a zinc alloy. It should also be appreciated that in other embodiments the outer surface 30 may be formed from the same material and include only textured facets or only smooth facets.

The handle 12 houses all of the electrical circuitry 44 of the trimmer 10, including a number of light emitting diodes (LEDs) 46 (see FIG. 10) positioned near the proximal end 16 and an electric-powered direct current (DC) motor having an output shaft 48 (see FIG. 8) operable to drive the cutting assembly 18. As described in greater detail below, the handle 12 includes a proximal receptacle 50 that extends inwardly from the proximal end 16 and is sized to receive the main body of the battery pack 20. The handle 12 also includes a distal receptacle 52 that is defined in the opposite end 14. As shown in FIG. 1, the cutting assembly 18 covers the receptacle 52 when it is attached to the handle 12. In the illustrative embodiment, the receptacle 52 is sized to house the adjustment mechanism 54 of the cutting assembly 18.

Figure 3:
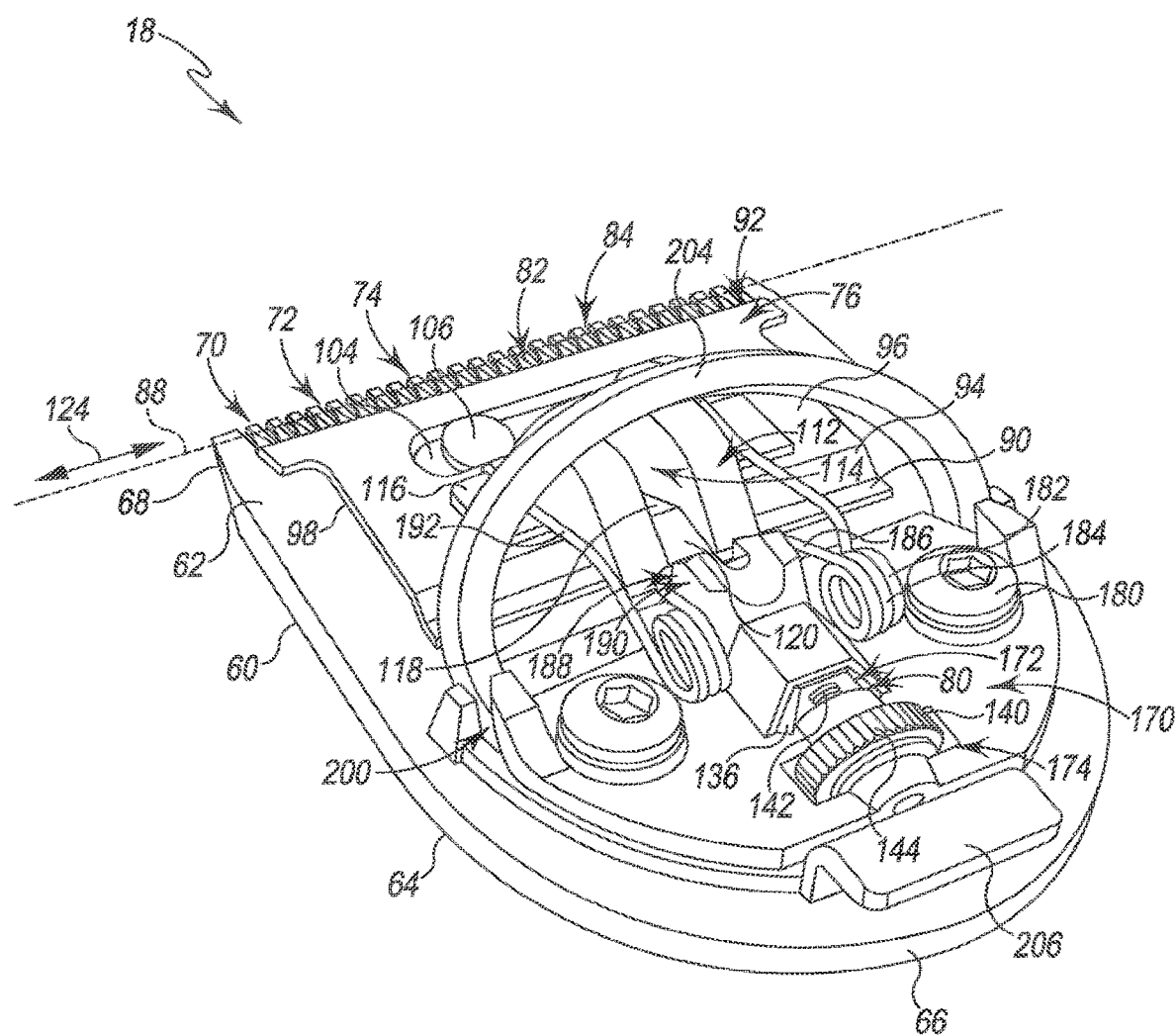
FIG. 3 is a rear perspective view illustrating the cutting assembly of the trimmer of FIG. 1.
Figure 4:
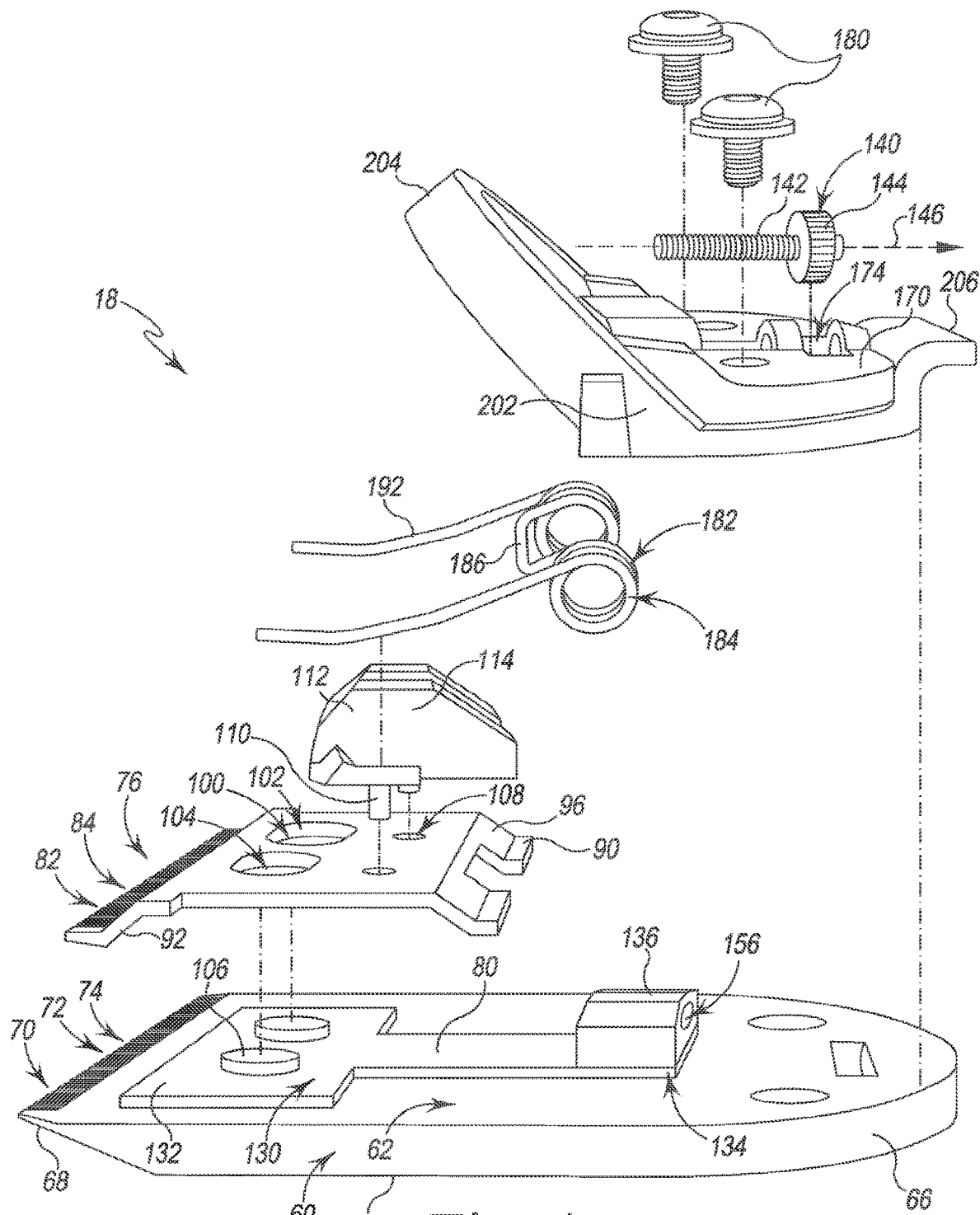
FIG. 4 is a partially exploded perspective view illustrating the cutting assembly of the trimmer of FIG. 1.

Referring now to FIGS. 3-4, the cutting assembly 18 includes an outer body 60 that is sized to cover the distal receptacle 52 when the cutting assembly 18 is attached to the handle 12. In the illustrative embodiment, the outer body 60 is formed as a single monolithic component from a metallic material such as, for example, stainless steel. The outer body 60 includes a planar proximal surface 62, a planar distal surface 64, and a curved outer wall 66 that extends between the surfaces 62, 64. The outer body 60 also includes a connecting surface 68 that extends away from the distal surface 64 to a front edge 70 of the outer body 60. In the illustrative embodiment, the connecting surface 68 is substantially planar, but it should be appreciated that in other embodiments it may be curved.

The outer body 60 of the assembly 18 also has a plurality of cutting teeth 72 defined along the front edge 70. Each cutting tooth 72 of the body 60 extends forward from a base to a pointed, cantilevered tip, and the teeth 72 cooperate to define a stationary blade 74, which is not moved by the electric motor during a trimming operation. As shown in FIG. 3, the cutting assembly 18 also includes a moveable blade 76 that is moved by the electric motor during the trimming operation. In the illustrative embodiment, the blade 76 is also attached to an adjustment mechanism 80, which may be operated by the user between trimming operations to adjust the separation between the blades 74, 76 and hence adjust the amount of hair removed by the trimmer 10.

As shown in FIG. 3, the blade 76 has a front foot 82 that engages the proximal surface 62 of the outer body 60.

Similar to the stationary blade 74, the blade 76 has a plurality of cutting teeth 84 defined along the front foot 82. Each cutting tooth 84 extends forward from a base to a pointed, cantilevered tip. The tips of the cutting teeth 84 cooperate to define an imaginary cutting line 88 extending laterally across the front foot 82. In some embodiments, the cutting teeth 72, 84 may include protective coatings. In another embodiment, the distal planar surface 64 of the cutting assembly 18 includes protective coatings. The protective coatings may be lubricious, hydrophobic, and oleophobic. In one embodiment, the coating may be a non-volatile organic compound (non-VOC) silicate, non-polytetrafluoroethylene (non-PTFE), high-temperature release coating used for stainless steel and other metallic surfaces.

Similar to the outer body 60, the moveable blade 76 is formed as a single monolithic component from a metallic material such as, for example, stainless steel. In the illustrative embodiment, the blade 76 also includes a pair of rear feet 90 that also engage the proximal surface 62, and a number of legs 92, 94 that extend upwardly from the feet 82, 90, respectively, to a central section 96 of the blade 76. As shown in FIG. 3, a gap 98 is defined between the central section 96 and the proximal surface 62 of the body 60.

As shown in FIG. 4, the central section 96 of the blade 76 has a pair of oblong-shaped openings 100 defined therein. An inner wall 102 extends inwardly from each oblong-shaped opening 100 to define a pair of oblong slots 104 extending through the central section 96 of the blade 76. As described in greater detail below, each slot 104 is sized to receive a peg 106, which couples blade 76 to the adjustment mechanism 80. In another embodiment the blade 76 may have a single oblong-shaped opening 100 defined therein, sized to receive a pair of pegs 106, which couple blade 76 to the adjustment mechanism. In the illustrative embodiment, the central section 96 has a pair of through-holes 108 defined therein, which are positioned rearward of the slot 104. Each through-hole 108 is sized to receive a pin 110 of a drive bracket 112. As described in greater detail below, the drive bracket 112 is configured to connect the blade 76 to the output shaft 48 of the electric motor.

Returning to FIG. 3, the drive bracket 112 includes a body 114 and a pair of flanges 116 that extend outwardly from the main body 114. One of the pins 110 extends distally from each flange 116 to couple the drive bracket 112 to the moveable blade 76. A central, longitudinal channel 118 is defined in a proximal surface 120 of the bracket body 114. The channel 118 is sized to receive a portion of the output shaft 48 to connect the output shaft 48 (and hence the motor) to the drive bracket 112 and, through the drive bracket 112, to the moveable blade 76. As shown in FIG. 3, the drive bracket 112 also includes a distal flange 122, which engages the planar proximal surface 62 of the outer body 60 and is positioned between the rear feet 90 of the blade 76. In operation, the electric motor causes the drive bracket 112 to move laterally as indicated by arrows 124 in FIG. 3, thereby causing the moveable blade 76 to move laterally relative to the stationary blade 74.

As described above, the cutting assembly 18 also includes an adjustment mechanism 80, which may be operated by the user between trimming operations to adjust the separation between the blades 74, 76 and hence adjust the amount of hair removed by the trimmer 10. As shown in FIG. 4, the adjustment mechanism 80 includes a plate 130 that extends from a front end 132 to a rear end 134. The front end 132 of the plate 130 is positioned in the gap 98 defined between the central section 96 of the blade 76 and the planar proximal surface 62 of the outer body 60. The pair of pegs 106, which couple to blade 76 to the adjustment mechanism 80, are positioned adjacent to the front end 132 and extend proximally from the plate 130. At rear end 134 of the plate 130, a guide block 136 extends proximally from the plate 130.

Figure 5:
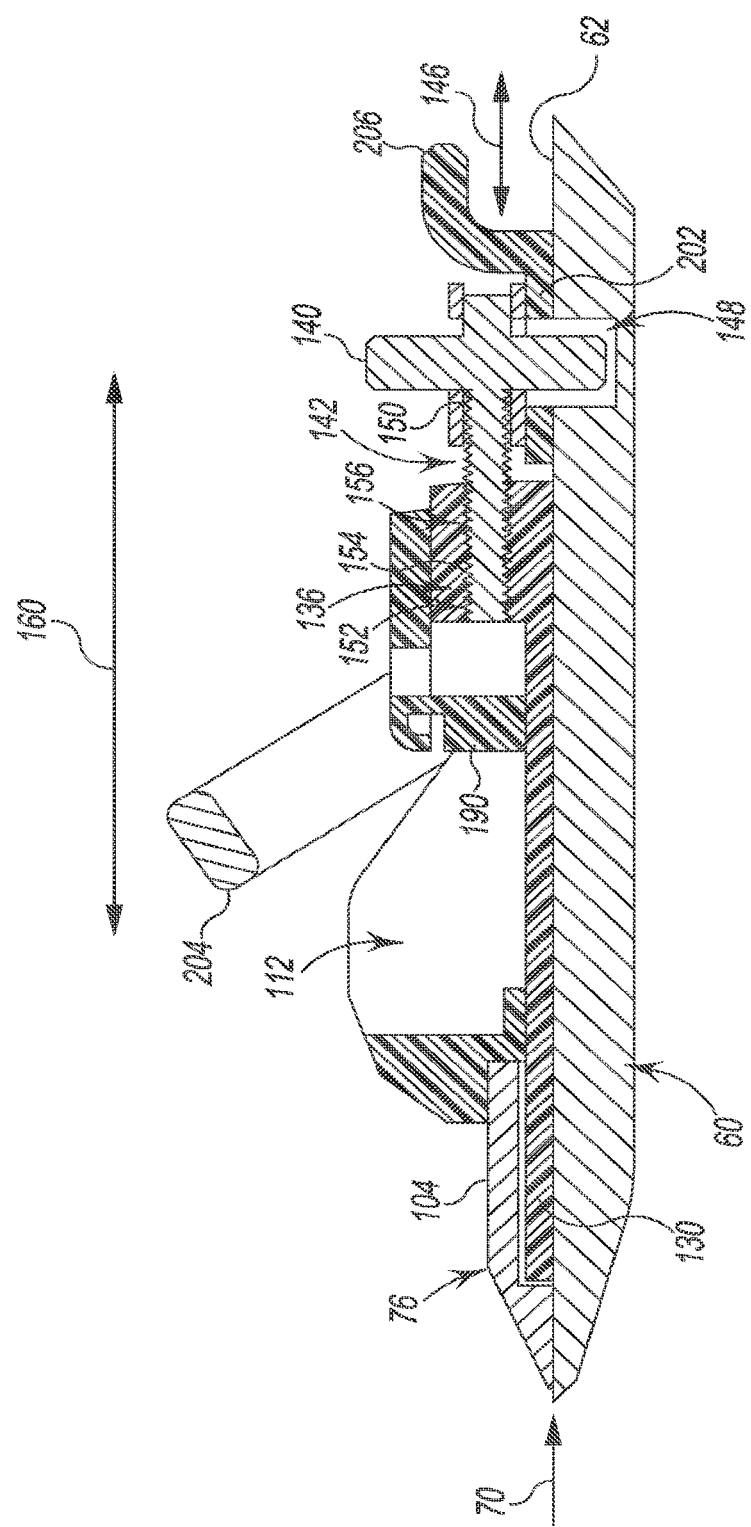
FIG. 5 is a cross-sectional side elevation view illustrating the cutting assembly of the trimmer of FIG. 1.

The adjustment mechanism 80 also includes a manually-operated wheel 140 that is connected to the guide block 136 via a threaded shaft 142. The wheel 140 includes a knurled outer surface 144 to permit the user to grip the wheel 140 and rotate it about its central axis 146. In one embodiment, the manually-operated wheel 140 may be a thumb-operated wheel. As shown in FIG. 5, the wheel 140 is positioned in a lateral slot 148 defined in the planar proximal surface 62 of the outer body 60. The threaded shaft 142 extends from a rear end 150 connected to the wheel 140 to a front end 152 positioned in an aperture 154 defined in the guide block 136. The aperture 154 is defined by an internally-threaded inner wall 156 that corresponds to the externally-threaded shaft 142.

Figure 6:
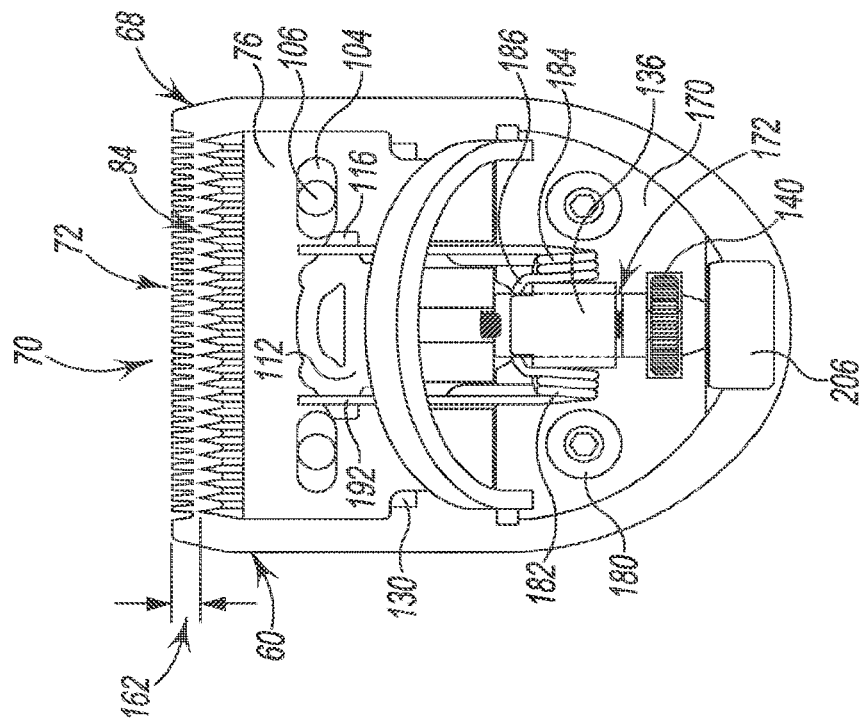
FIG. 6 is a top plan view illustrating the cutting assembly of the trimmer of FIG. 1 in a first position.
Figure 7:
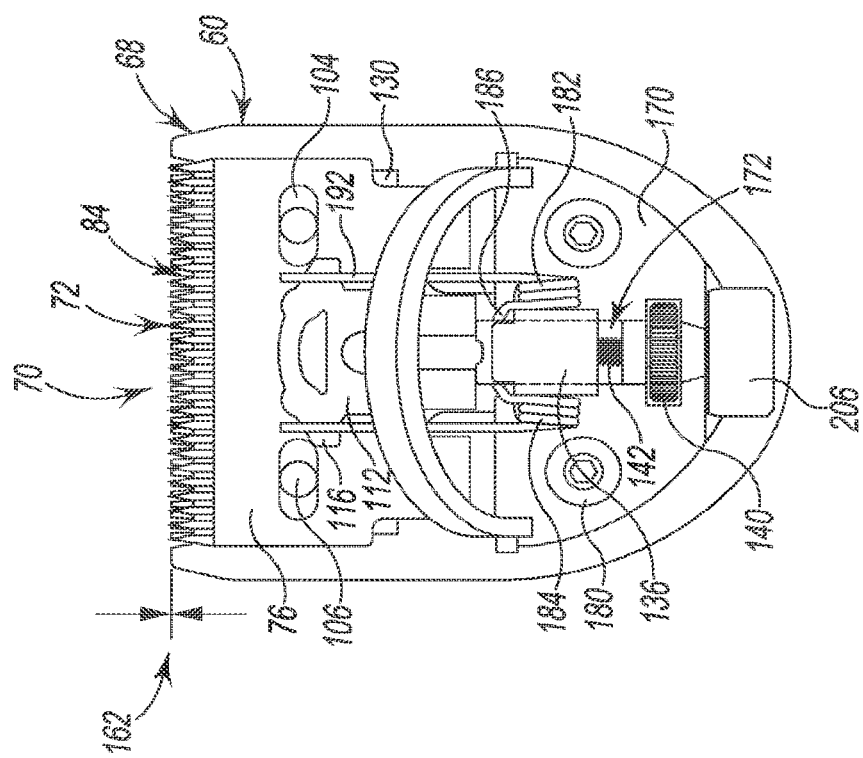
FIG. 7 is a view similar to FIG. 6 illustrating the cutting assembly in a second position.

When the wheel 140 is rotated about its axis 146, the engagement between the shaft 142 and the wall 156 causes the block 136 (and hence the plate 130), to move forward or backward as indicated by arrow 160 in FIG. 5. Because each peg 106 positioned in the oblong slots 104 of the moveable blade 76, the moveable blade 76 is moved or backward with the plate 130, toward or away from the front edge 70 of the outer body 60. As shown in FIG. 6, when the wheel 140 is rotated in one direction, the blade 76 is moved toward the front edge 70, thereby reducing the cutting gap 162 defined between the cutting teeth 72, 84 such that the amount of hair removed by the trimmer 10 is reduced. As shown in FIG. 7, when the wheel 140 is rotated in the opposite direction, the blade 76 is moved away from the front edge 70, thereby increasing the cutting gap 162 defined between the cutting teeth 72, 84 such that the amount of hair removed by the trimmer 10 is increased. Also as shown in FIG. 6, in one embodiment, when the wheel 140 is fully turned in one direction, the cutting gap 162 is about 0 mm. In one embodiment, the cutting gap 162 may be from about 0.2 mm to about 1.0 mm.

In the illustrative embodiment, the wheel 140 and the shaft 142 are formed as a single integral component from a metallic material such as, for example, stainless steel. In other embodiments, the wheel 140 and the shaft 142 may be formed separately and later assembled. The wheel and/or the shaft may be formed from a plastic material. The plate 130, the pegs 106, and the guide block 136 are also formed as a single integral component from a hard plastic material. It should be appreciated that in other embodiments the plate 130, the pegs 106, and the guide block 136 may be formed separately and later assembled. Additionally, some or all of those components may be formed from a metallic material.

Returning to FIG. 3, the cutting assembly 18 also includes a cover plate 170 that is positioned over the adjustment mechanism 80. In the illustrative embodiment, the guide block 136 is positioned in a slot 172 defined in the cover plate 170. The slot 172 is sized to permit the guide block 136 to move forward and/or backward over the full range of trimming sizes. The wheel 140 is also positioned in a lateral slot 174 defined in the cover plate 170. As shown in FIG. 3, a pair of fasteners 180 (illustratively, screws) extend through the cover plate 170 to secure the cover plate 170 to the outer body 60 of the cutting assembly 18. The cover plate 170, like the outer body 60, is illustratively formed from as a single integral component from a metallic material such as, for example, stainless steel.

The cutting assembly 18 also includes a biasing element—in this case, a spring 182—that is configured to bias the moveable blade 76 into engagement with the outer body 60 (and hence the stationary blade 74). The spring 182 includes a pair of coils 184 connected by a wire section 186. In the illustrative embodiment, the wire section 186 is secured in a forward-facing channel 188 defined in a post 190 of the cover plate 170. The spring 182 also includes a pair of legs 192 that engage the pair of flanges 116 of the drive bracket 112 to provide a downward force on the moveable blade 76 and urge the blade 76 into contact with the outer body 60.

Returning to FIGS. 3-4, the cutting assembly 18 also includes a mounting bracket 200 that is configured to secure the cutting assembly 18 to the elongated handle 12. The mounting bracket 200 includes a mounting plate 202 positioned between the outer body 60 and the cover plate 170. In the illustrative embodiment, the plate 202 (and hence the bracket 200) is secured to the cover plate 170 via the pair of fasteners 180 described above. The mounting bracket 200 includes an arched bar 204 that extends outwardly from the front end of the plate 202 and a flange 206 that extends outwardly from the rear end of the plate 202. The mounting bracket 200 is illustratively formed as a single integral component from a hard plastic material. It should be appreciated that in other embodiments the components of the bracket 200 may be formed separately and later assembled. Additionally, some or all of those components may be formed from a metallic material.

Figure 8:
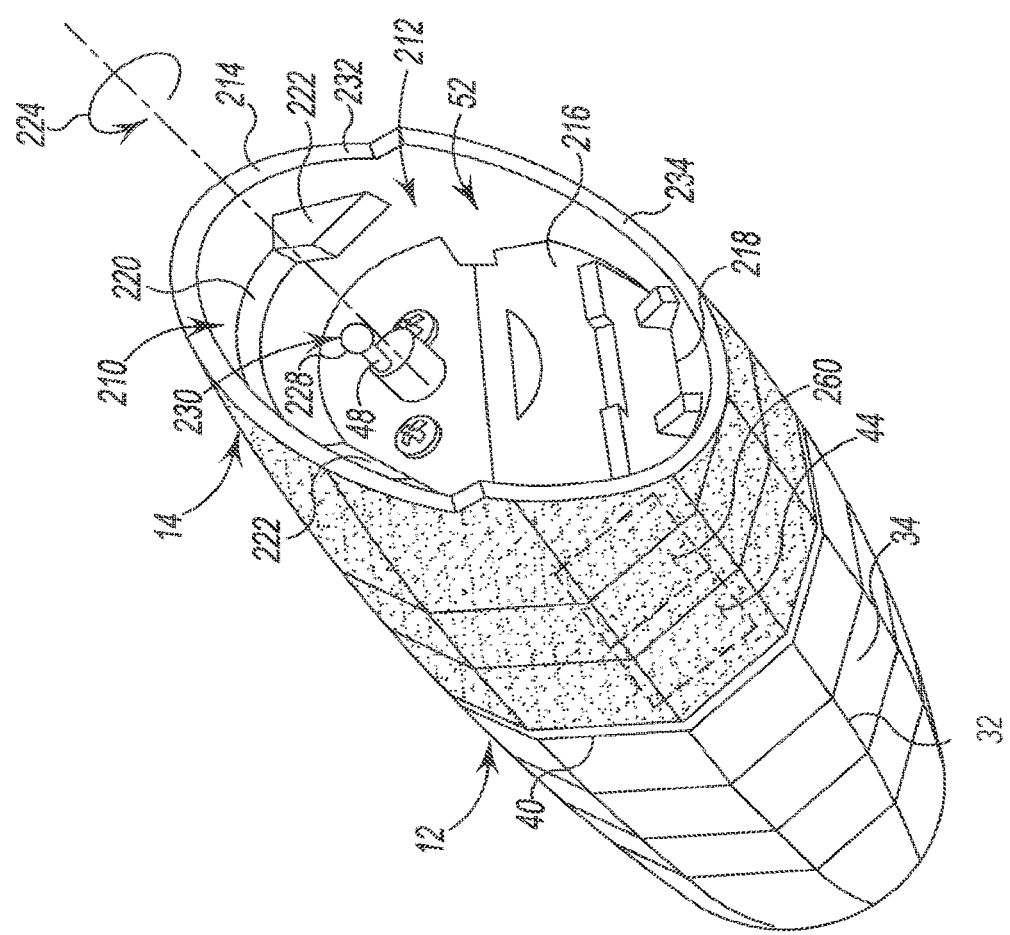
FIG. 8 is a front perspective view illustrating the handle of the trimmer of FIG. 1.

Referring now to FIG. 8, the distal end 14 of the elongated handle 12 has the receptacle 52 defined therein. As described above, the receptacle 52 is sized to house the adjustment mechanism 80 of the cutting assembly 18. In the illustrative embodiment, the receptacle 52 extends inwardly from a distal opening 210. An inner wall 212 extends inwardly from a rim 214 that defines the opening 210 to a base wall 216. The walls 212, 216 cooperate to define the receptacle 52.

In the illustrative embodiment, the handle 12 includes a central slot 218 that is defined in the rim 214. The slot 218 is rectangular and is sized to receive the mounting flange 206 of the cutting assembly 18. The handle 12 also has a groove 220 defined in the inner wall 212 opposite the central slot 218. The groove 220 is arch-shaped and is sized to receive the arched bar 204 of the mounting bracket 200. When the arched bar 204 is positioned in the groove 220, the walls of the groove 220 grip the arched bar 204 to secure the cutting assembly 18 to the handle 12. A pair of stop flanges 222 extend inwardly from the inner wall 212 to prevent the arched bar 204 from advancing beyond the groove 220.

As shown in FIG. 8, the output shaft 48 of the electric motor is configured to rotate about an axis 224. The shaft 48 extends outwardly through an opening 226 defined in the base wall 216. The output shaft 48 has a distal tip 228 that includes a spherical outer surface 230, and the distal tip 228 of the output shaft 48 is offset from the rotational axis 224. The distal tip 228 is sized and shaped to be positioned in the longitudinal channel 118 of the drive bracket 112 when the cutting assembly 18 is secured to the handle 12. In the illustrative embodiment, the output shaft 48 is formed from a metallic material such as stainless steel, and the outer surface 230 is substantially smooth.

It should be appreciated that the rim 214 defining the distal opening 210 of the handle 12 includes a pair of stepped surfaces 232, 234. The rear stepped surface 234 is configured to engage the planar proximal surface 62 of the outer body 60 when the assembly 18 is attached to the handle 12. The front stepped surface 232 is positioned proximal of the rear stepped surface 234 such that a slot 236 (see FIG. 1) is defined between the surface 232 and the outer body 60. In the illustrative embodiment, the slot 236 is sized to permit the movement of the blade 76 during a trimming operation.

Figure 9:
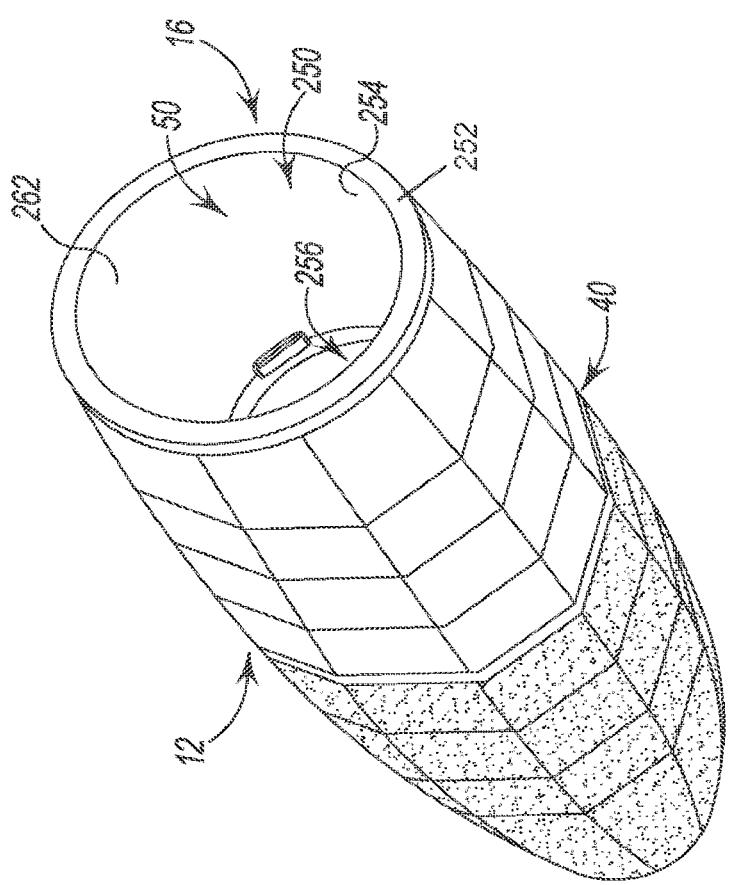
FIG. 9 is a rear perspective view illustrating the handle of the trimmer of FIG. 1.

Referring now to FIG. 9, the proximal end 16 of the elongated handle 12 has the receptacle 50 defined therein. As described above, the receptacle 50 is sized to house the body of the battery pack 20. The receptacle 50 extends inwardly from a proximal opening 250 that is defined by a rim 252. An inner wall 254 extends inwardly from the rim 252 to a base wall 256. The walls 254, 256 cooperate to define the receptacle 50, which is illustratively cylindrical.

As described above, the handle 12 houses the electrical circuitry 44 of the trimmer 10. In the illustrative embodiment, the electric motor 260 and other circuitry of the trimmer 10 are positioned between the base walls 216, 256. The LEDs 46 of the circuitry 44 are positioned in an annular groove 258 defined in the inner wall 254 of the receptacle 50. As shown in FIG. 9, the inner wall 254 includes a substantially transparent proximal section 262. The proximal section 262 extends between the groove 258 and the rim 252 such that when the LEDs 46 are energized, light generated by the LEDs is transmitted through the proximal section 262 and outward through the rim 252.

Figure 10:
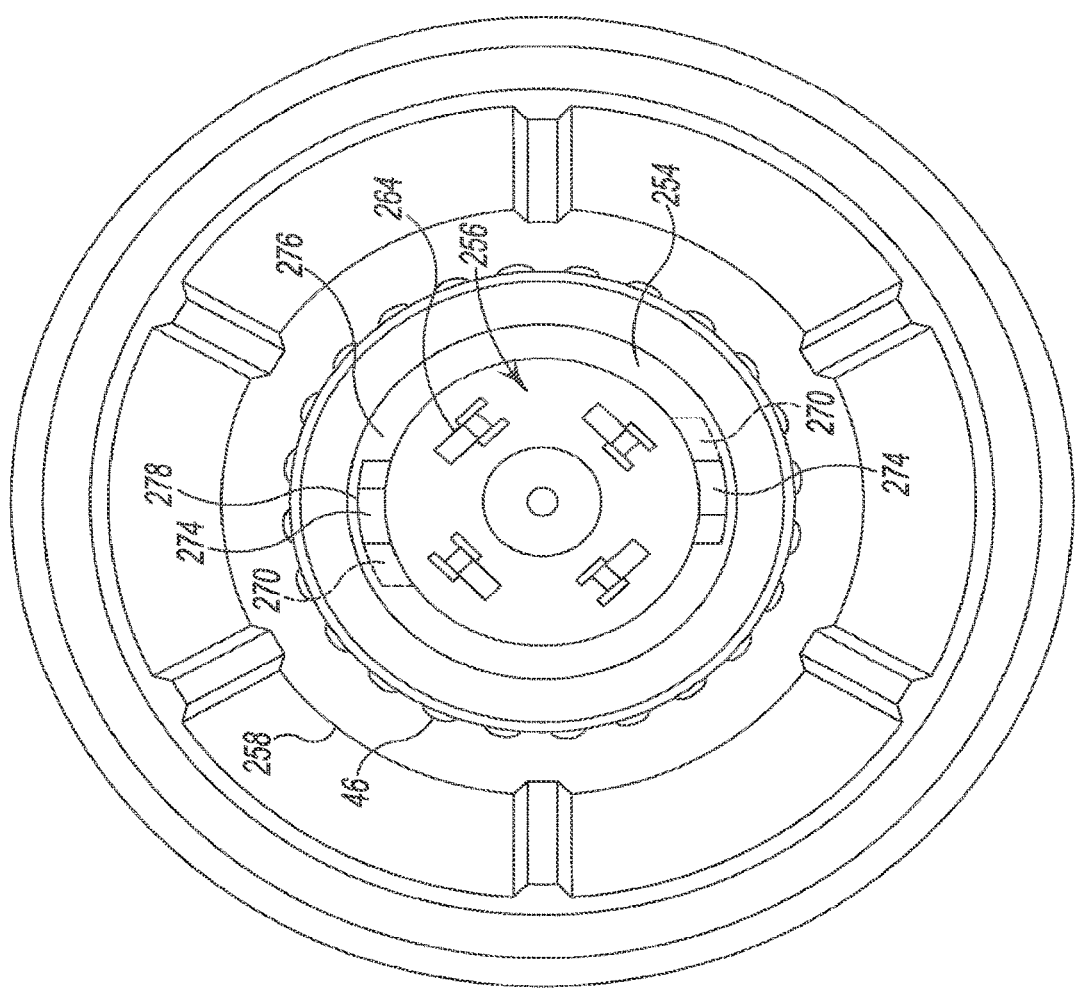
FIG. 10 is a partial section perspective view illustrating a front section of a receptacle of the handle of the trimmer of FIG. 1.

Referring now to FIG. 10, the handle 12 also includes one or more electrical contacts 264 positioned in the base wall 256. Each contact 264 is configured to electrically interface with a corresponding electrical contact 266 of the battery pack 20. In that way, electrical power from the battery pack 20 may be supplied to the other electrical circuitry 44 of the trimmer 10.

In the illustrative embodiment, the inner wall 254 of the handle 12 has a pair of circumferential locking slots 270 defined therein, which are configured to receive a corresponding pair of bayonets 272 extending from the body of the battery pack 20. A proximal-facing groove 274 is defined in the inner wall 254 to permit the passage of a bayonet 272 into each locking slot 270. As shown in FIG. 10, the groove 274 extends through an inner wall 276 that cooperates with other walls 278 to define each slot 270. As described in greater detail below, the bayonets 272 and the locking slots 270 cooperate to secure the battery pack 20 to the elongated handle 12.

Returning to FIG. 2, the battery pack 20 includes a cylindrical body 280 that is shaped to be received in the proximal receptacle 50 and a proximal tip 282 attached to the end of the body 280. The proximal tip 282 includes a rim surface 284 that is configured to engage the rear rim 252 of the handle 12 and a conical surface 286 that connects the rim surface 284 to the proximal-most surface 288 of the pack 20. As described above, the proximal-most surface 288 has a socket 22 defined therein that is sized to receive the plug 26 of the electrical cord 28. In the illustrative embodiment, the battery pack 20 includes a power switch 290, which may be operated by the user to provide power to the other electrical circuitry 44 of the trimmer 10.

The switch 290 includes a button 292 that is configured to slide forward and backward between an "on" position in which power may be supplied to the circuitry 44 and an "off" position in which no power is supplied. The button 292 includes a knurled outer surface that may be gripped by a user to move the button 292. As shown in FIG. 2, the button 292 is received in a longitudinal groove 294 defined in the conical surface 286.

Figure 11:
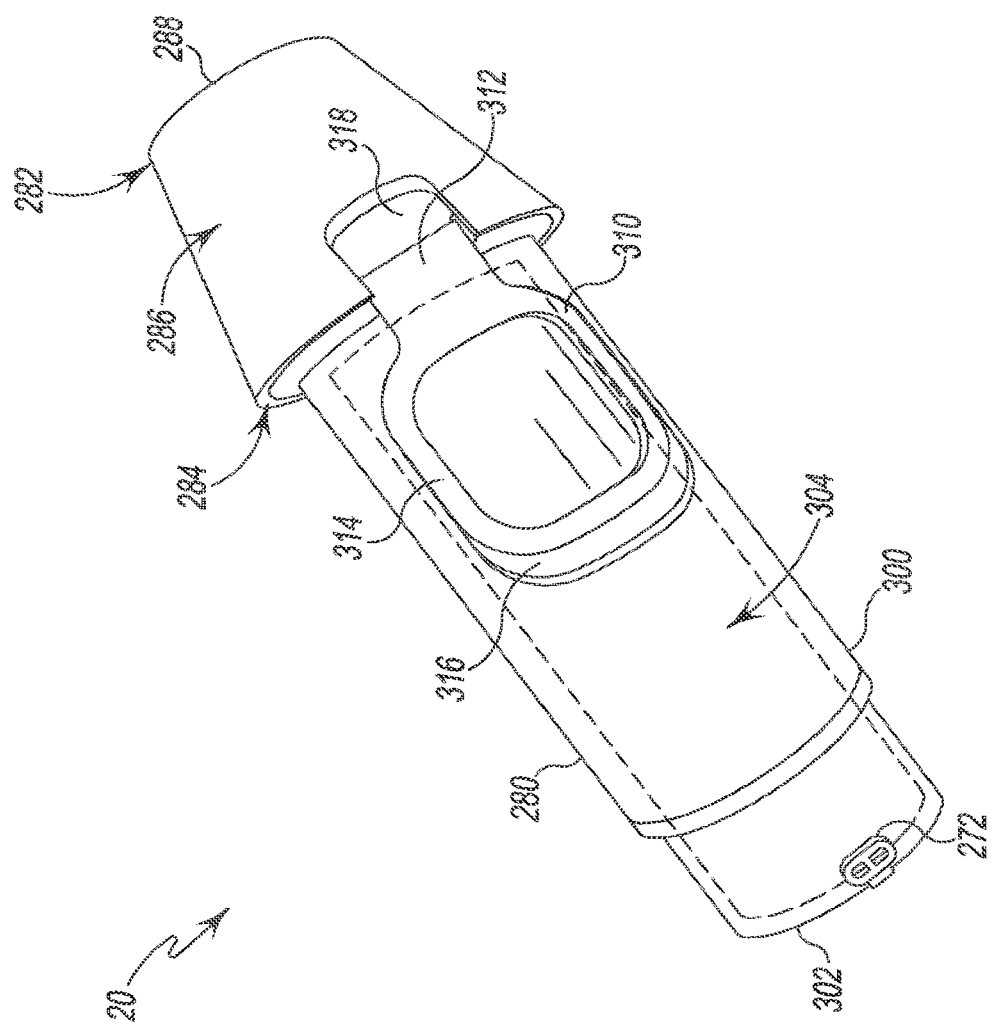
FIG. 11 is a bottom perspective view illustrating the battery pack of the trimmer of FIG. 1.

Referring now to FIGS. 11-12, the cylindrical body 280 of the battery pack 20 includes a stepped outer surface 300. The locking bayonets 272 extend outwardly from the body 280 on opposite sides thereof. In the illustrative embodiment, the bayonets 272 are integrally formed with the cylindrical body 280 from a plastic material. It should be appreciated that in other embodiments the cylindrical body may be formed from other materials. As shown in FIG. 2, the electrical contacts 266 of the battery pack 20 are defined in a distal surface 302 of the pack 20. In one embodiment, the battery pack 20 may include a lithium-ion battery 304, such as a 18650, 3.7V, 2900 mAh or 3400 mAh lithium-ion cell with overcharge and discharge protection circuitry, or a similar type battery.

In the illustrative embodiment, the battery pack 20 includes a retractable hook 310 that may be used to hang the trimmer 10 for storage during use. The hook 310 has an end 312 that is hinged to the cylindrical body 280. The hook 310 has an annular frame 314 extending from the end 312 and is sized to be received in a groove 316 defined in the cylindrical body 280. When the hook 310 is retracted as shown in FIG. 11, the annular frame 314 is positioned below the outer surface of the cylindrical body 280 to permit the battery pack 20 to be positioned in the receptacle 50. When the hook 310 is pivoted to the extended position shown in FIG. 12, the annular frame 314 extends outwardly through a slot 318 defined in the proximal tip 282 of the battery pack 20. In that way, the end 312 of the hook 310 is positioned proximal of the rim surface 284 of the tip 282 such that the battery pack 20 may be positioned in the receptacle 50 in the extended position.

In use, a user may select a battery pack 20 having a full electrical charge. The user may then align the battery pack 20 with the longitudinal axis 320 and the proximal receptacle 50 of the handle 12, as shown in FIG. 2. The user may then advance the cylindrical body 280 along the axis 320 into the receptacle 50. If the bayonets 272 are aligned with the grooves 274, the bayonets 272 may be advanced into their corresponding locking slots 270. If the bayonets 272 are not aligned, the user may rotate the battery pack 20 about the axis 320 to align the bayonets 272 with the grooves 274. After the bayonets 272 are positioned in the locking slots 270, the user may rotate the battery pack 20 about the axis 320 to advance the bayonets 272 deeper into the locking slots 270, thereby locking the pack 20 to the handle 12. In that position, the electrical contacts 266 of the battery pack 20 are in contact with the electrical contacts 264 of the handle 12.

A user may optionally hang the trimmer 10 for storage by removing the battery pack 20 from the handle 12, as previously described. The user may then pull the annular frame 314 from the retracted position shown in FIG. 11, to the deployed position shown in FIG. 12. After the hook 310 has been extended to the deployed position, the battery pack 20 may be reinserted and secured to the handle 12 according to the steps previously described for securing the battery pack 20 the handle 12. Once the hook 310 is in the deployed position, and the battery pack 20 has been secured to the handle 12, a user may hang the trimmer 10 for storage.

The user may utilize the adjustment mechanism 54 of the cutting assembly 18 to adjust the cutting gap 162 defined between the blades 74, 76. To do so, the user may grip the front edge 70 of the assembly 18 and pull in the direction indicated by arrow 322 in FIG. 1. As the user pulls on the front edge 70, the arched bar 204 is advanced out of the groove 220 defined in the handle 12 to detach the cutting assembly 18 from the handle 12. The user may then grip the wheel 140 to rotate the wheel 140 about its axis 146 to increase or decrease the size of the cutting gap 162, as described above.

When the user has moved the blade 76 to the desired position, the user may reattach the cutting assembly 18. To do so, the user may position the mounting flange 206 in the central slot 218 defined in the distal rim 214 of the handle 12. The user may then pivot the cutting assembly 18 in the direction opposite the arrow 322 in FIG. 1 to move the bar 204 into engagement with the groove 220 to secure the cutting assembly 18 to the handle 12. At the same time, the distal tip 228 of the output shaft 48 is advanced into the longitudinal channel 118 to connect the moveable blade 76 to the electric motor 260.

To operate the trimmer 10, a user may advance the button 292 along the longitudinal axis 320 to the "on" position. In the "on" position, an electrical switch is closed permitting electrical power to be supplied from the battery pack 20 (and electrical cord 28 when connected) through the contacts 264, 266 to the other electrical circuitry 44 of the trimmer 10. When power is supplied to the LEDs 46, the LEDs 46 are energized and light is transmitted outward through the transparent handle rim, indicating to the user that the trimmer 10 is powered. When power is supplied to the electric motor 260, the electric motor 260 causes the output shaft 48 to rotate about its axis 224. Because the distal tip 228 is offset from the axis 224, the engagement between the distal tip 228 and the drive bracket 112 causes the drive bracket 112 (and hence the moveable blade 76) to move laterally as indicated by arrows 124 in FIG. 3 to cut hair positioned in the cutting teeth 72, 84.

While the disclosure has been illustrated and described in detail in the drawings and foregoing description, such illustration and description is to be considered as exemplary and not restrictive in character, it being understood that only illustrative embodiments have been illustrated and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present embodiments and fall within the spirit and scope of the present disclosure as defined by the appended claims.

What is claimed is:

1. An electric-powered trimmer comprising:
   a handle,
   a battery pack positioned in the handle, the battery pack including a battery for providing electrical power,
   an electrical circuit positioned in the handle and electrically connected with the battery, the electrical circuit including a motor having a drive shaft, and
   a cutting assembly removeably coupled to the handle, the cutting assembly comprising:
   a stationary blade,
   a moveable blade positioned on the stationary blade such that a cutting gap is defined between the moveable blade and the stationary blade, the moveable blade being configured to move along a first axis and a second axis extending orthogonal to the first axis, a drive mechanism connected between the drive shaft and the moveable blade to move the moveable blade relative to the stationary blade along the first axis, wherein the handle extends along a longitudinal axis and has an inner wall that defines a receptacle in a longitudinal end, and the battery pack is received in the receptacle of the handle, wherein the battery pack is configured to rotate about the longitudinal axis relative to the handle between (i) a first position in which the battery pack is secured within the receptacle of the handle and (ii) a second position in which the battery pack is configured to be removed from the receptacle of the handle, and the battery pack includes a mounting hook pivotable between (i) a retracted position in which the mounting hook is received in the receptacle and (ii) an extended position in which the mounting hook extends outwardly from the receptacle.

2. The electric-powered trimmer of claim 1, wherein the battery pack has a groove sized to receive the mounting hook when the mounting hook is the retracted position.

3. The electric-powered trimmer of claim 1, wherein when the battery is in the second position, the battery pack is configured to slide along the longitudinal axis of the handle to be removed from the receptacle.

4. The electric-powered trimmer of claim 3, wherein:
the battery pack comprises a pair of locking bayonets extending outwardly from a case housing the battery,
the handle includes a pair of slots defined in the inner wall, each slot being sized to receive a locking bayonet, and
when the battery pack is rotated to the first position, each bayonet is received in one of the pair of slots to secure the battery pack to the handle.

5. The electric-powered trimmer of claim 4, wherein:
the locking bayonets extend outwardly from a first end of the case, and
the battery pack further includes a power socket defined on a second end of the case.

6. The electric-powered trimmer of claim 1, further comprising a plurality of light emitting diodes (LEDs) positioned in the inner wall of the handle, wherein the inner wall includes a transparent section that covers the plurality of LEDs and the transparent section extends from a first end positioned in the receptacle to a second end positioned at the longitudinal end of the handle such that light emitted from the LEDs is transmitted outward from the longitudinal end.

7. The electric-powered trimmer of claim 1, wherein:
the handle has a groove defined therein, and
the cutting assembly includes a mounting bar connected to the stationary blade, the mounting bar extending outwardly from the stationary blade and received in the groove to secure the cutting assembly to the handle.

8. The electric-powered trimmer of claim 7, wherein:
the handle has a slot defined therein, and
the cutting assembly further includes a flange extending outwardly from the stationary blade and received in the handle slot.

9. An electric-powered trimmer comprising:
a handle,
a battery pack positioned in the handle, the battery pack including a battery for providing electrical power,
an electrical circuit positioned in the handle and electrically connected with the battery, the electrical circuit including a motor having a drive shaft, and
a cutting assembly removeably coupled to the handle, the cutting assembly comprising:
a stationary blade,
a moveable blade positioned on the stationary blade such that a cutting gap is defined between the moveable blade and the stationary blade, the moveable blade being configured to move along a first axis and a second axis extending orthogonal to the first axis,
a drive mechanism connected between the drive shaft and the moveable blade to move the moveable blade relative to the stationary blade along the first axis, and wherein the handle extends along a longitudinal axis and has an inner wall that defines a receptacle in a longitudinal end, and the battery pack is received in the receptacle of the handle, wherein the battery pack is configured to rotate about the longitudinal axis relative to the handle between (i) a first position in which the battery pack is secured within the receptacle of the handle and (ii) a second position in which the battery pack is configured to be removed from the receptacle of the handle, and wherein the handle has a groove defined therein, and the cutting assembly includes a mounting bar connected to the stationary blade, the mounting bar extending outwardly from the stationary blade and received in the groove to secure the cutting assembly to the handle and wherein the battery pack includes a mounting hook pivotable between (i) a retracted position in which the mounting hook is received in the receptacle and (ii) an extended position in which the mounting hook extends outwardly from the receptacle.

10. The electric-powered trimmer of claim 9, wherein:
the handle has a slot defined therein, and
the cutting assembly further includes a flange extending outwardly from the stationary blade and received in the handle slot.

11. The electric-powered trimmer of claim 9, wherein the battery pack has a groove sized to receive the mounting hook when the mounting hook is the retracted position.

12. The electric-powered trimmer of claim 9, wherein when the battery is in the second position, the battery pack is configured to slide along the longitudinal axis of the handle to be removed from the receptacle.

13. The electric-powered trimmer of claim 12, wherein:
the battery pack comprises a pair of locking bayonets extending outwardly from a case housing the battery,
the handle includes a pair of slots defined in the inner wall, each slot being sized to receive a locking bayonet, and
when the battery pack is rotated to the first position, each bayonet is received in one of the pair of slots to secure the battery pack to the handle.

14. The electric-powered trimmer of claim 13, wherein:
the locking bayonets extend outwardly from a first end of the case, and
the battery pack further includes a power socket defined on a second end of the case.

15. An electric-powered trimmer comprising:
a handle,
a battery pack positioned in the handle, the battery pack including a battery for providing electrical power,
an electrical circuit positioned in the handle and electrically connected with the battery, the electrical circuit including a motor having a drive shaft, and
a cutting assembly removeably coupled to the handle, the cutting assembly comprising:
a stationary blade, a moveable blade positioned on the stationary blade such that a cutting gap is defined between the moveable blade and the stationary blade, the moveable blade being configured to move along a first axis and a second axis extending orthogonal to the first axis, a drive mechanism connected between the drive shaft and the moveable blade to move the moveable blade relative to the stationary blade along the first axis, and an adjustment mechanism coupled to the moveable blade, the adjustment mechanism including an adjustment screw operable to move the moveable blade along the second axis relative to the stationary blade to selectively change the size of the cutting gap, wherein the handle extends along a longitudinal axis and has an inner wall that defines a receptacle in a longitudinal end, and the battery pack is received in the receptacle of the handle, wherein the battery pack is configured to rotate about the longitudinal axis relative to the handle between (i) a first position in which the battery pack is secured within the receptacle of the handle and (ii) a second position in which the battery pack is configured to be removed from the receptacle of the handle, wherein the battery pack includes a mounting hook that is configured to be received in the receptacle and the mounting hook is pivotable between (i) a retracted position in which the mounting hook is received in the receptacle and (ii) an extended position in which the mounting hook extends outwardly from the receptacle.

16. The electric-powered trimmer of claim 15, further comprising a plurality of light emitting diodes (LEDs) positioned in the inner wall of the handle, wherein the inner wall includes a transparent section that covers the plurality of LEDs.

17. The electric-powered trimmer of claim 15, wherein:
the handle has a groove defined therein, and
the cutting assembly includes a mounting bar connected to the stationary blade, the mounting bar extending outwardly from the stationary blade and received in the groove to secure the cutting assembly to the handle.

* * * * *